UNITED STATES PATENT OFFICE.

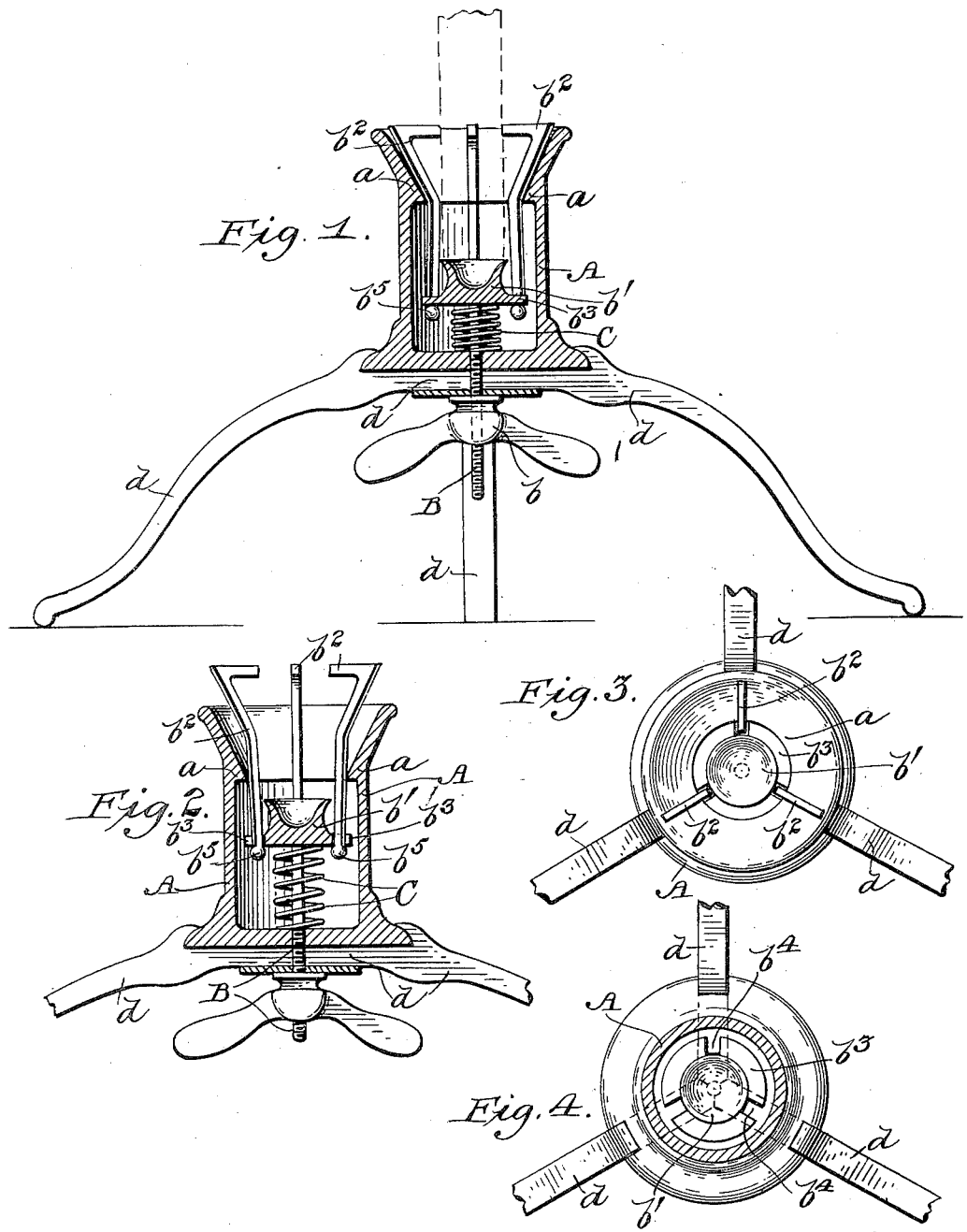

JULIUS WEINERT, OF CHICAGO, ILLINOIS.

TREE OR STAFF HOLDER.

SPECIFICATION forming part of Letters Patent No. 649,785, dated May 15, 1900.

Application filed September 8, 1899. Serial No. 729,858. (No model.)

*To all whom it may concern:*

Be it known that I, JULIUS WEINERT, a citizen of the United States, residing at Chicago, in the county of Cook and State of Illinois, have invented certain new and useful Improvements in Tree or Staff Holders; and I do hereby declare the following to be a full, clear, and exact description of the invention, such as will enable others skilled in the art to which it appertains to make and use the same.

My invention is designed for holding Christmas trees, but may be used for other purposes—as, for instance, for supporting flag or other staffs; and the invention consists in certain novel constructions, combinations, and arrangements of parts, as will be hereinafter described and specifically claimed.

The object of the invention is the production of a Christmas-tree or other holder which is very simple in its construction and operation and which is adapted to be adjusted to fit trees or staffs of different diameters.

In the accompanying drawings, Figure 1 is a vertical section through my improved holder, showing the gripping-jaws in a lowered condition. Fig. 2 is a similar section showing the gripping-jaws in a raised condition. Fig. 3 is a top plan view of the device, and Fig. 4 is a horizontal section through the device on the line of the connection of the gripping-jaws with the vertically-moving socket.

A in the drawings represents a box or body portion which is of any suitable shape and size and which is open at its upper end and provided with an inwardly-extending beveled portion or shoulder $a$. The bottom of the body or box portion is also provided with an opening through which a vertically-moving rod B passes, said rod having screw-threads upon which a winged nut $b$ is applied for raising and lowering the said rod and also a socket $b'$ and gripping-jaws $b^2$, carried thereby for the purpose of readily receiving the lower end of the tree when the jaws and socket are in a raised position and by screwing up the winged nut to draw the rod and the jaws and socket carried thereby downwardly and inwardly to grip and hold the tree. The socket $b'$ is rigidly secured to the upper end of the rod B and is provided with a flange $b^3$, having notches or apertures $b^4$, through which the jaws $b^2$ pass, said jaws being provided with heads or enlargements $b^5$ for engaging the under side of the flange $b^3$, so as to prevent their being pulled out, the said jaws being further held in position by the beveled portion or shoulder $a$, formed on the base or box portion A, the jaws, however, being permitted to spread outwardly at their upper ends above the beveled surface. From this construction and arrangement it will be apparent that by turning the winged nut $b$, which bears upon the under side of the box or base portion of the device, the rod B, carrying the socket and the jaws, will be raised or lowered, and when the rod is in its highest position the jaws will be spread the farthest, so as to readily receive the lower end of the tree. A spring or cushion C is provided around the rod B and is interposed between the under side of the socket and the upper surface of the base, so that the socket and jaws will be normally held in a raised position, the object of this construction being that the jaws will always be in a position to receive the tree and will not have to be pushed up with the fingers and held in such position while the winged nut is being turned to draw down the rod and jaws to grip the tree. I regard this as an important feature of my invention. A washer or plate is interposed between the under side of the base of the box or body portion and the winged nut for the purpose of having interposed between it and the base suitable legs $d$, preferably three in number, to form a tripod for supporting the body portion, by reason of which construction when the winged nut is screwed up to draw down the jaws and grip the tree the said legs will be simultaneously gripped between the said plate $d$ and the under side of the base. I regard this as another important feature of my invention.

The production of a solid box or body portion having a beveled portion or shoulder and a normally-raised spring-actuated socket and jaws and means for raising and lowering the jaws to grip the tree constitute a very simple and perfect holder for trees, flagstaffs, and the like.

Having now described my invention, what I claim as new, and desire to secure by Letters Patent, is—

In a tree or staff holder, the combination of a suitable body portion for receiving the lower end of the tree or staff, a normally-raised spring-actuated socket, a series of vertically-arranged jaws having inwardly-extending upper ends engaging the socket at their lower ends and having a sufficient space between them to permit the end of a tree or staff to pass downwardly and rest upon the socket, a threaded rod extending downwardly from said socket and carrying a nut for raising and lowering the jaws, and holding them in an adjusted position, and an inwardly-extending beveled portion on the body portion of the holder for forcing the jaws inwardly to grip the tree or staff as the jaws are lowered, substantially as described.

In testimony whereof I hereunto affix my signature in presence of two witnesses.

JULIUS WEINERT.

Witnesses:
    CONRAD IHL,
    GEORGE GAESSWITZ.